(12) United States Patent
Bhogal et al.

(10) Patent No.: US 8,494,891 B2
(45) Date of Patent: Jul. 23, 2013

(54) MEETING SCHEDULING SYSTEM WITH OPTIONS FOR RESOLVING SCHEDULING CONFLICTS

(75) Inventors: Kulvir Singh Bhogal, Fort Worth, TX (US); Robert Ross Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 12/116,400

(22) Filed: May 7, 2008

(65) Prior Publication Data

US 2009/0281860 A1 Nov. 12, 2009

(51) Int. Cl.
*G06Q 10/1095* (2006.01)
*G06Q 10/10* (2012.01)

(52) U.S. Cl.
CPC .................................. *G06Q 10/1095* (2013.01)
USPC ........................................................ 705/7.19

(58) Field of Classification Search
CPC ................................................ G06Q 10/1095
USPC .................................... 705/7, 7.19
See application file for complete search history.

(56) References Cited

U.S. PATENT DOCUMENTS

| 6,898,569 | B1 * | 5/2005 | Bansal et al. ...................... 705/9 |
| 7,283,970 | B2 * | 10/2007 | Cragun et al. ..................... 705/8 |
| 7,660,851 | B2 * | 2/2010 | Manion et al. ................. 709/204 |
| 7,693,736 | B1 * | 4/2010 | Chu et al. ........................... 705/9 |
| 2003/0217073 | A1 * | 11/2003 | Walther et al. ............. 707/104.1 |
| 2005/0027805 | A1 | 2/2005 | Aoki |
| 2006/0031326 | A1 | 2/2006 | Ovenden |
| 2006/0047557 | A1 * | 3/2006 | Bieselin et al. .................... 705/9 |
| 2006/0117087 | A1 | 6/2006 | Demsky et al. |
| 2007/0021997 | A1 * | 1/2007 | Hayes, et al. ....................... 705/9 |
| 2008/0162247 | A1 * | 7/2008 | Hurmola et al. ................... 705/9 |
| 2008/0177611 | A1 * | 7/2008 | Sommers et al. ................. 705/8 |
| 2008/0195312 | A1 * | 8/2008 | Aaron et al. .................. 701/209 |
| 2008/0235071 | A1 * | 9/2008 | Gutta et al. ........................ 705/9 |
| 2009/0094088 | A1 * | 4/2009 | Chen et al. ........................ 705/9 |

OTHER PUBLICATIONS

Andy Chun, Hon Wai, and Rebecca Y.M. Wong, Optimizing agent-based meeting scheduling through preference estimation, Elsevier, Engineering application of artificial intelligence, Jun. 30, 2003, http://www.cs.cityu.edu.hk/~hwchun/research/PDF/MeetingAI2004.pdf.*

* cited by examiner

*Primary Examiner* — Peter Choi
*Assistant Examiner* — Kurtis Gills
(74) *Attorney, Agent, or Firm* — Brevetto Law Group

(57) ABSTRACT

Methods and systems are provided for sending out meeting notices that specify logistics for both a primary meeting and an alternate meeting. The invitees are to respond, indicating their availability for attending the primary and alternate meetings. Based on the invitee responses, the system sets up the meeting for either the primary time/place for the meeting or the alternate time/place for the meeting. The final meeting notices are sent out to the invitees informing them of the meeting logistics.

23 Claims, 4 Drawing Sheets

MEETING SCHEDULING SYSTEM WITH OPTIONS FOR RESOLVING SCHEDULING CONFLICTS

BACKGROUND

1. Field

The present invention relates to office communication and automation systems, and more specifically, to automated systems, methods and computer products for scheduling meetings.

2. Background

Meetings among employees are essential to conducting business. Nearly all businesses and organizations rely on meetings to some extent to plan projects, conduct operations, report results, and make business decisions. Voicemail and email are very useful business tools that make communications more convenient. However, the convenience of voicemail and email cannot replace real-time interfacing between employees in many situations. For this reason, there will always be a need to schedule and conduct meetings. Yet, the busy schedules and time constraints of today's workers make scheduling a meeting an increasingly difficult task. When setting up a meeting it can be hard to find a time for scheduling the meeting that is open on all of the calendars of the invitees to the meeting.

Automated tools for setting up meetings such as MicroSoft Outlook™ include some limited features for coordinating the schedules of individual attendees and working out scheduling conflicts. For example, to schedule a meeting using Outlook™, an email is sent out to all invitees with a proposed time for the meeting. In some versions of Outlook™, an individual can use their calendar function to detect scheduling conflicts. However, in order to accept the meeting invitation, the individual may have to cancel any other conflicting meetings on their schedule. Other tools for scheduling meetings are available, including Apple Automator™ and Google's™ calendar feature. These conventional tools can also be used to schedule meetings for a group, but they too provide little flexibility in resolving scheduling conflicts for the individuals invited to the meeting.

What is needed is a more flexible and efficient tool for scheduling meetings that provides individuals with options for resolving schedule conflicts.

SUMMARY

Embodiments disclosed herein address the above stated needs by providing systems, methods and computer products for scheduling meetings. For example, various embodiments provide systems, methods and computer products that set up a meeting by sending a meeting invitation to invitees. The meeting invitation specifies the logistics (e.g., time and place) for both a primary meeting and an alternate meeting. The responses received back from the invitees indicate an availability to attend at least one of the primary meeting and the alternate meeting. In some embodiments, if the invitee is able to attend the meeting at both times, the invitee is prompted with an option to specify a preference for either the primary or alternate meeting. Based on the responses the system selects either the primary meeting or the alternate meeting to be the selected meeting. Then final meeting notices are sent out to at least those invitees who are available to attend the selected meeting.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

It is not unusual for a person receiving a meeting invitation—an invitee to the meeting—to have a scheduling conflict that prevents the person from attending the meeting. The person's attendance at the meeting may be important, in some situations determining whether or not the meeting can be carried out. Conventional tools for setting up meetings rely on the person sending out the invitations for resolving scheduling conflicts of the invitees to the meeting. This can be inefficient inasmuch as it can sometimes take two or three rounds of sending out meeting invitations in order to resolve all the scheduling conflicts and get the meeting set up. The various embodiments disclosed herein overcome these drawbacks, allowing the person sending out the invitations to proactively propose alternate meeting schedules in case the primary schedule does not work. Some of the present embodiments allow selected invitees the option of adjusting the meeting schedule to conform to events already scheduled on their calendar.

Figure 1:
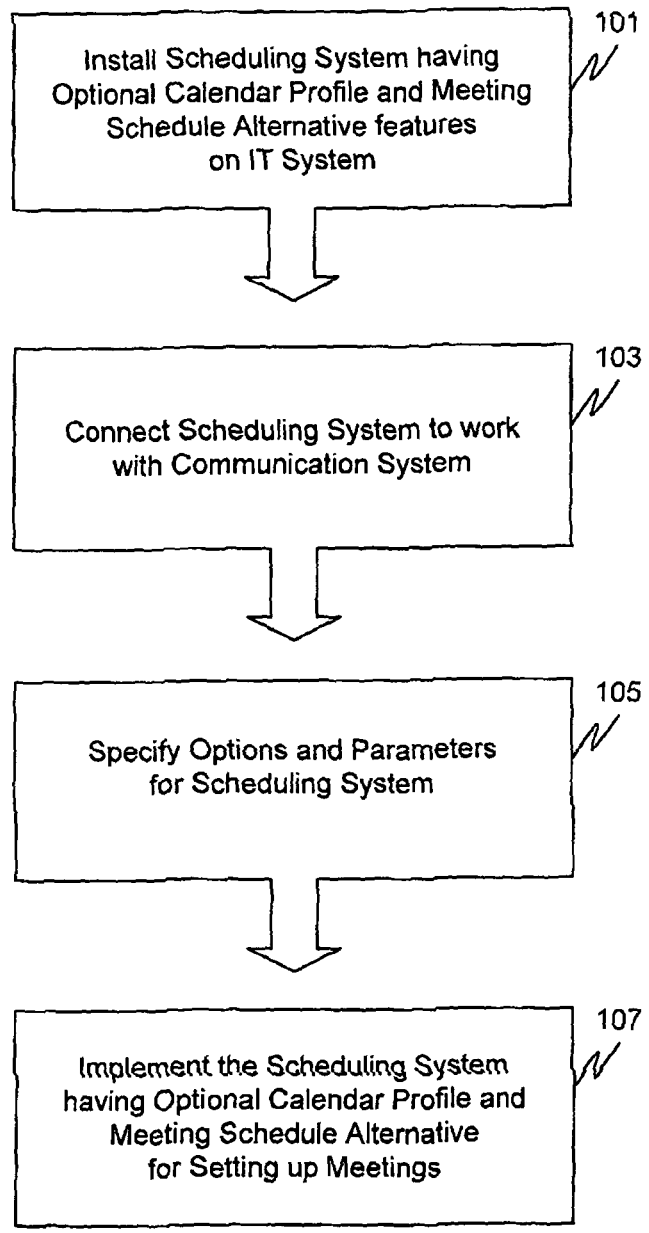
FIG. 1 depicts exemplary activities in setting up and implementing embodiments of a meeting coordination system with options for resolving scheduling conflicts.

FIG. 1 depicts a number of exemplary activities involved in setting up and implementing a meeting scheduling system as disclosed herein. In block 101 the meeting scheduling system is loaded or otherwise installed on an information technology (IT) system, or an individual information handling device such as a computer system of the person who will be sending out the meeting invitations. Depending upon the particular implementation of the present invention, the various embodiments may be used in conjunction with a conventional email/calendar application to supplement its capabilities and provide the ability to set up a meeting, providing the invitees with the option to specify an alternative meeting time to resolve scheduling conflicts. The various embodiments of the meeting scheduling system disclosed herein may be implemented as a stand-alone application, providing both communication capabilities to send meeting invitations (e.g., email) and a calendaring function for setting up meetings and resolving scheduling conflicts. Various embodiments may also be implemented in conjunction with an existing email application or scheduling system, either as a program or other logic that works in conjunction with the existing application or as an attachment that cooperates with the existing email application.

The activities of 101 typically entail installing the application software of the meeting scheduling system from a computer product purchased from a vendor, or procured from another source. For example, the application software may be downloaded from the Internet, received as an email attachment, or uploaded from a CD, diskette, or other machine readable storage device suitable for storing the application software. Once the application software has been obtained, it is loaded on to a computer or other information handling device accessible by the person who will be sending the meeting invitations. It is not necessary that all invitees who may receive meeting invitations have application software for the meeting scheduling system loaded onto their computer. The invitees need only have the capability to receive the invitation and reply back with a response. In some instances, the person coordinating the meeting may be the only one with the application software for the meeting scheduling system loaded onto their computer (or other IT device). In other instances, the meeting scheduling system may be implemented and running on every one or (or many of) the invitees' IT systems. In a typical embodiment, the meeting scheduling system is an application software product purchased or acquired by a company and installed on the computer system of the individual who will be sending out meeting invitations. In other embodiments, the meeting coordination system may be run remotely, for example, via a network of the company or as an Internet application accessible at a website. Upon completing the installation of the application software, or otherwise providing access to the system, the method proceeds from 101 to 103.

Figure 4:
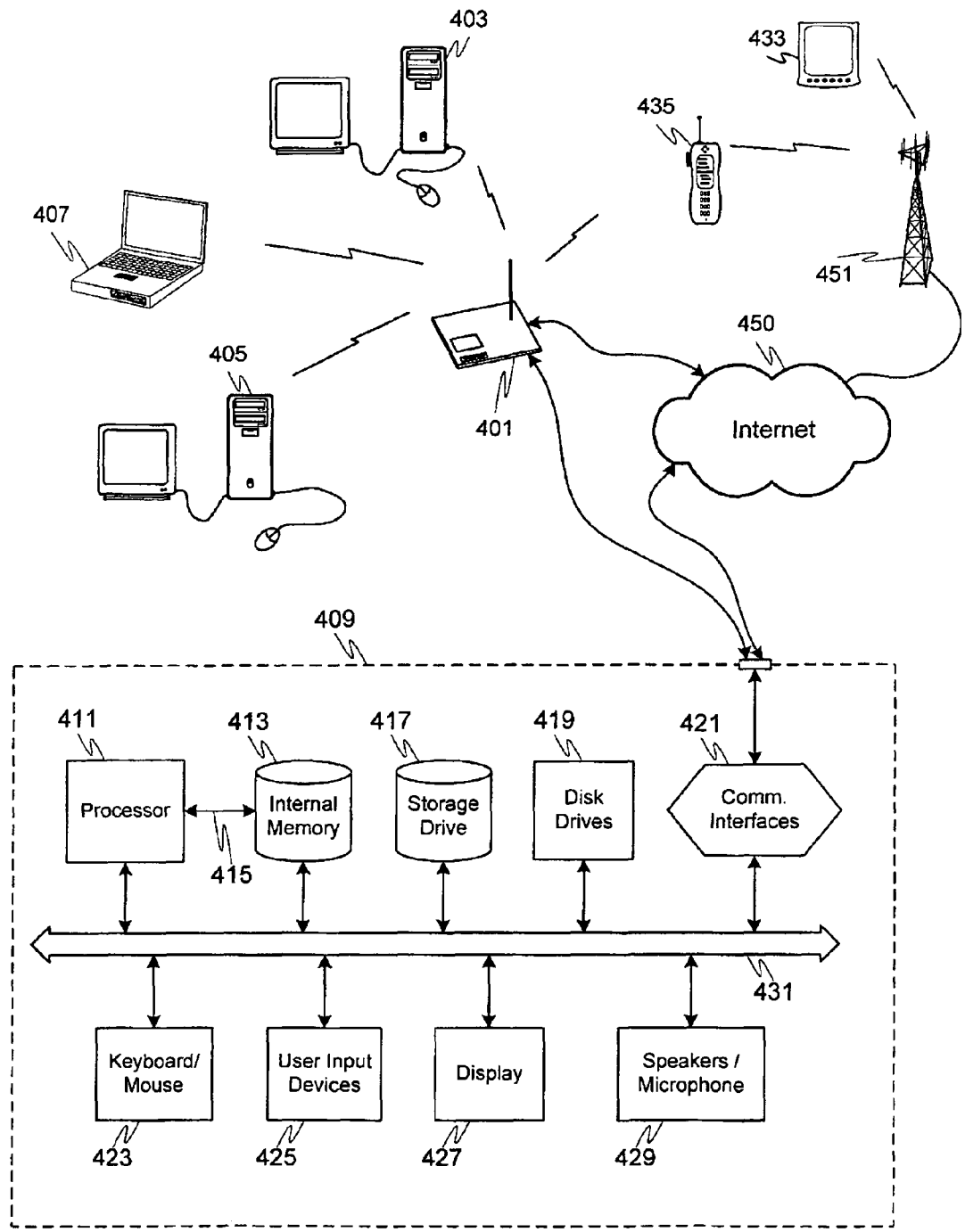
FIG. 4 is an information technology system suitable for practicing various exemplary embodiments.

In 103 the meeting scheduling system is provided access to communication links for sending the meeting invitations and receiving responses back from invitees. Various embodiments use email as a means of communicating meeting invitations. Such email invitations may be sent using a communication system of the company such as the company's network, phone system or other communication links. As an alternative to using a communication system of the company (or in addition to), the various embodiments may also use a communication system unrelated to a particular company or organization, such as the Internet, the public switched telephone network (PSTN) or any other such communication system. In lieu of email, the various embodiments may be configured to use text messaging, instant messaging, recorded telephone messages, or other like kinds of communication known to those of ordinary skill in the art to be suitable for sending meeting invitations and receiving responses back. In any case, the meeting scheduling system should be set up to provide communications to/from the meeting invitees using some communication system for the meeting invitations. Generally, responses are received back via the same communication system used to send the invitations, although this is not an absolute requirement. For example, the invitation may be sent out by email with an option provided to dial in to a telephone system for responding back, or with an option to respond via the Internet, by sending a text message, or other like means of communication. FIG. 4 depicts further details of a typical information handling device and communication system suitable for use with the various embodiments. Once the meeting scheduling system has been set up to communicate with potential invitees, the method proceeds from 103 of FIG. 1 to 105.

In 105 the various options and parameters are set up for the meeting scheduling system. These typically entail entering default settings for the system, to avoid the need to enter such data each time a meeting invitation is sent out. For example, one of the activities of 105 may be to provide the default language used in the email meeting invitations. In this way, the person sending out the invitation would only need to enter information specific to a particular meeting (e.g., topic, time, date, place, etc.). Another parameter set up in 105 may be the amount of time (or percentage of the invitation responses received back) the system waits after the invitations are sent out before proceeding with setting up the meeting. Another parameter set up in 105 may be settings for whether or not the invitees are to be prompted for a preference for either the primary meeting time/place or the alternate meeting time/place if the invitee is available to attend the meeting at both times. One other parameter may involve setting up the menuing system and prompts that are shown when a person begins preparing a meeting invitation. The application software can be set to provide more detailed prompts and instructions initially until the person using the application is familiar with the data entries, at which time the prompts and instructions can be disabled to save time for the knowledgeable user. In addition to these types of format parameters, the activities of 105 may include the provisioning of an address book listing potential invitees. The address listings for each potential invitee may specify a preferred means of communication. For example, some invitees may prefer receiving an email invitation at their company email address. Others may prefer to receive a text message invitation sent to their cellular telephones.

Figure 2:
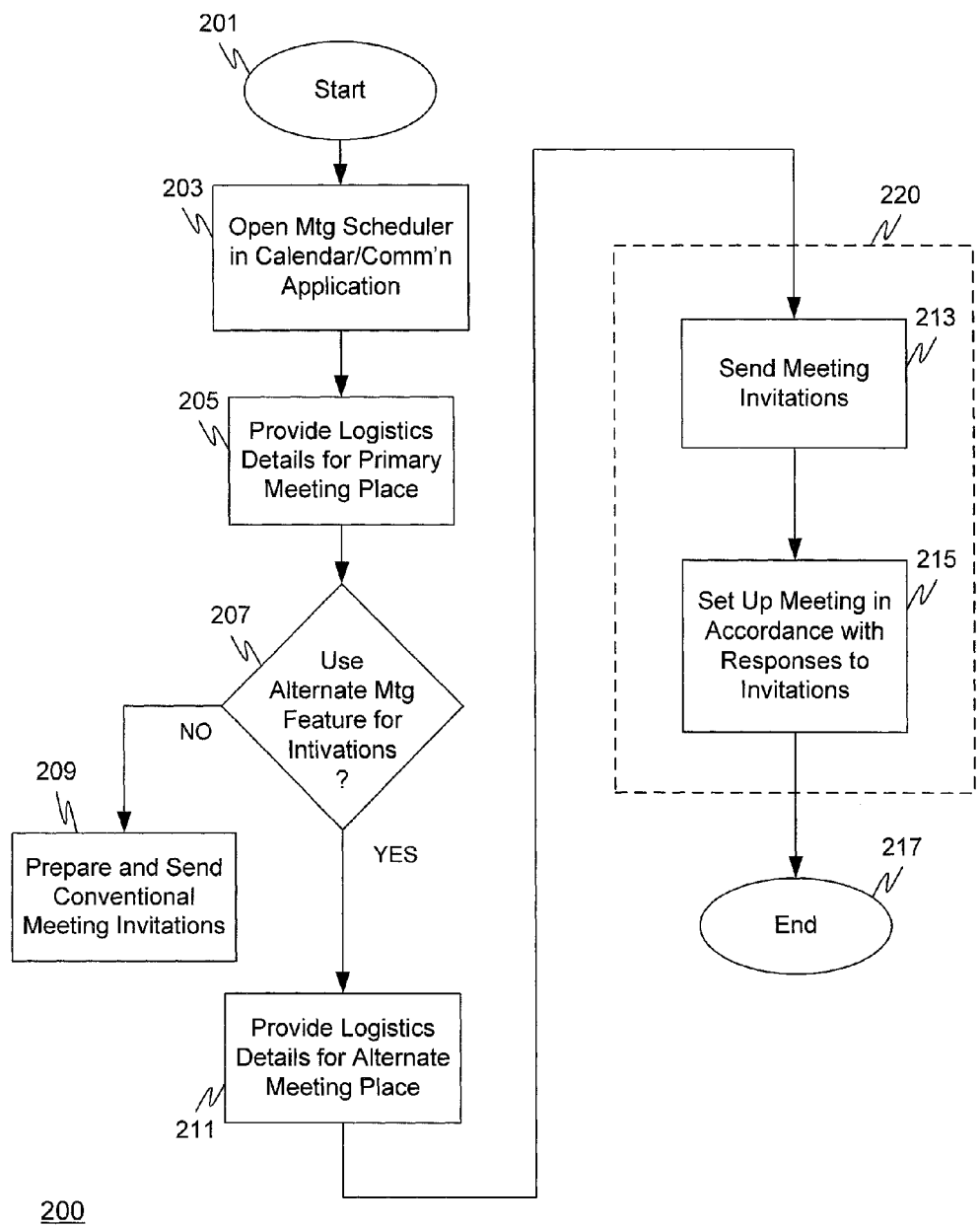
FIG. 2 is a flowchart depicting a method of preparing a meeting invitation specifying a primary meeting time/place and a secondary meeting time/place, according to various exemplary embodiments.
Figure 3:
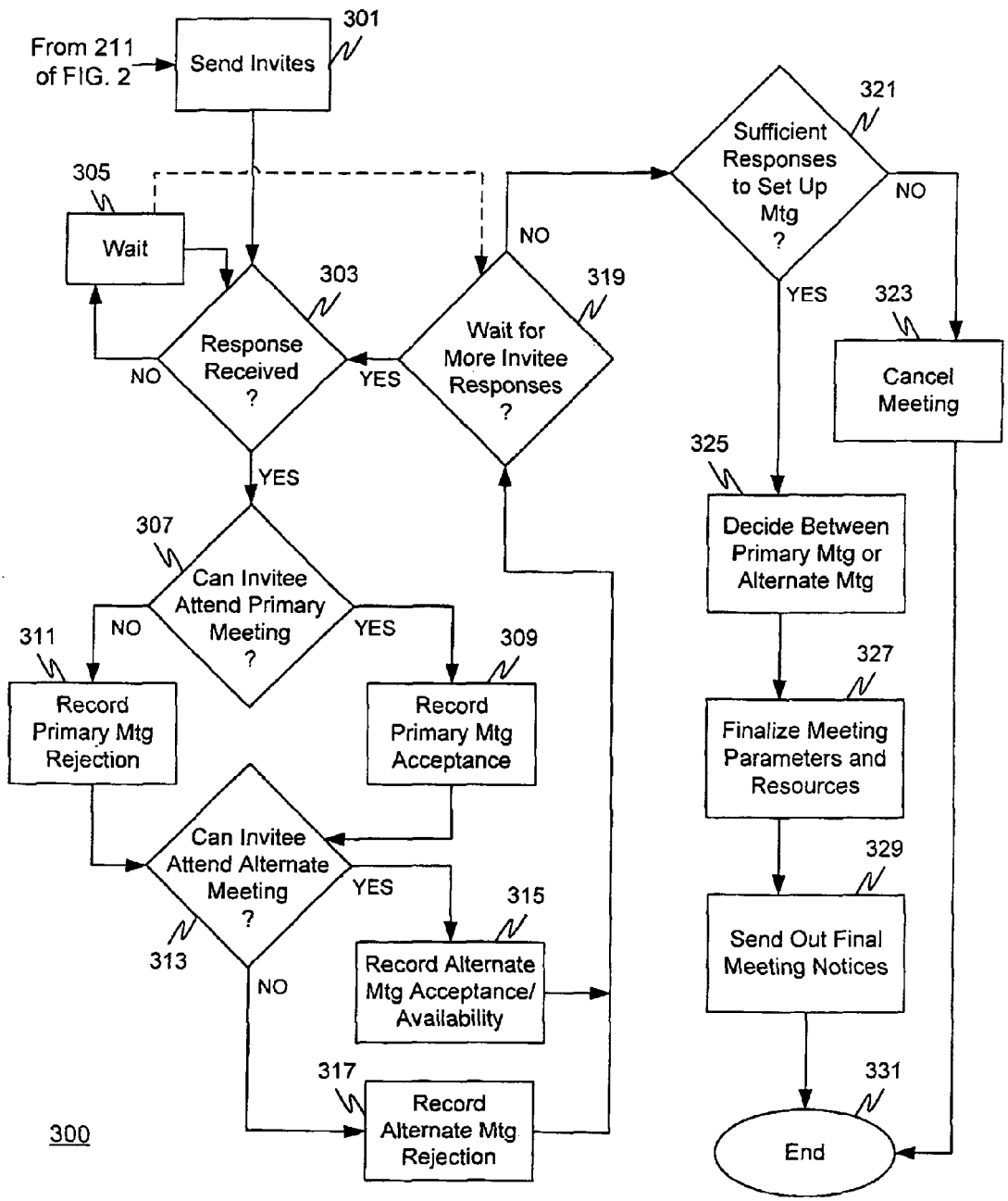
FIG. 3 is a flowchart depicting a method of sending out the meeting invitations specifying a secondary meeting time/place, and then setting up the meeting based on the meeting invitation responses received back at either the primary meeting time/place or the secondary meeting time/place, according to various exemplary embodiments.

In 107 the meeting scheduling system is implemented so that a user sending out a meeting invitation may specify an alternate time/place for the meeting to enhance the chances of successfully setting up the meeting either in the primary time/place or alternate time/place. This is especially useful in view of the increasingly busy schedule of today's business people. FIG. 2 shows further details for preparing an invitation with options for providing an alternative meeting selection, according to various exemplary embodiments. FIG. 3 shows further details of monitoring for responses from the invitees once the meeting invitations have been sent out, and using the responses to set up a meeting.

FIG. 2 is a flowchart depicting a method of preparing an invitation specifying a primary meeting time/place and a secondary meeting time/place, according to various exemplary embodiments. The method begins in 201 and proceeds to 203 where the meeting scheduler is opened, or the meeting scheduling system is otherwise started up to begin preparing a meeting invitation with dependencies. The method proceeds to 205 where the details of the meeting are entered, including for example, the meeting topic, time, place, meeting agenda, any required materials/facilities (e.g., viewgraphs, charts, data inputs, etc.), and other resources needed to hold the meeting. Once the meeting details have been entered, the method proceeds to 207.

In 207 it is determined whether the alternate meeting feature is to be used in sending out the invitations. If no alternate meeting is to be specified the meeting proceeds from 207 along the "NO" branch to 209 and the meeting is set up in a conventional manner. However, if the scheduling system is to be used in proposing an alternate meeting time/place the method proceeds from 207 along the "YES" branch to 211. In 211 the alternate time, place and other meeting logistics are specified for the meeting, in event the primary meeting time specified above in 205 cannot be attended or otherwise needs to be altered. In some embodiments more than one alternate meeting time may be specified (e.g., second alternate meeting logistics, third alternate meeting logistics, ect.). If more than one alternative meeting time is specified, depending upon the particulars of options set up in the implementation, they can be presented sequentially to invitees, one after another in case the proposed meeting times fail (either in the same or in different meeting invitations), or they may be presented at the same time to the invitees to provide them with a choice. To keep the present explanation from being overly complicated, the ensuing examples are described in terms of having only one alternate meeting time/place even though multiple alternate meeting times/places are within the scope of the invention.

Once the alternate meeting time has been specified in 211 the method proceeds to 213 to send the meeting invitations. Blocks 213-215 of FIG. 2 describe the meeting invitations being sent out and the meeting being set up in accordance with the responses received back, either in the primary time/place or the alternative time/place. Further details for these activities (i.e., block 220 encompassing 213 and 215) are provided in conjunction with FIG. 3. Once the meeting invitations have been sent specifying an alternative meeting time/place the method proceeds from 213 to 215. In block 215 the meeting is set up in accordance with the responses received back from the invitees. By taking into consideration the responses the meeting can be specified to take place in either the primary time/place or the alternate time/place, depending upon which time/place for the meeting will get the best attendance or otherwise provide the best results for the meeting. Upon completing 215 the method proceeds to 217 and ends.

FIG. 3 is a flowchart 300 depicting a method of sending out the meeting invitations specifying a secondary meeting time/place, and then setting up the meeting based on the meeting invitation responses received back at either the primary meeting time/place or the secondary meeting time/place. The method of FIG. 3 begins at 301 with the sending of the invitations to the various people being invited to the meeting. The invitations are typically sent via email, but may be sent by any type of communication found to be convenient to sending and receiving such messages. Once the invitations have been sent the method proceeds to 303 to determine whether any response have been received yet from the invitees. If no responses have yet been received the method proceeds along the "NO" branch to 305 to wait for responses. If the conditions for proceeding with the method are satisfied while waiting in block 305 the method proceeds from 305 along the dotted line to 319. (See further discussion of this situation in conjunction with 319, below.) Once a response has been received the method proceeds from 303 along the "YES" branch to 307.

In 307 the response is evaluated to determine whether or not the invitee can attend the primary meeting. If the invitee cannot attend the primary meeting the method proceeds from 307 along the "NO" branch to 311 to record the invitee's rejection of the primary meeting. However, if the invitee can attend the primary meeting the method proceeds from 307 along the "YES" branch to 313 to record the invitee's acceptance of the primary meeting. The method then proceeds to 313 to determine whether or not the invitee can attend the alternate meeting. As above, if the invitee cannot attend the alternate meeting the method proceeds from 313 along the "NO" branch to 317 to record the invitee's rejection of the alternate meeting. However, if the invitee can attend the alternate meeting the method proceeds from 313 along the "YES" branch to 315 to record the invitee's acceptance of the alternate meeting. In some embodiments the invitee may indicate an availability to attend the meeting whether it is held in the primary time/place or the alternate time place. In such embodiments the system may prompt the invitee to indicate a preference between the two meetings. The method then proceeds to 319.

In 319 it is determined whether there are more responses expected from the invitations sent out. This may be determined in a number of different manners. For example, if all the invitees have responded then no more responses would be expected and the method could proceed along the "NO" branch to 321. Quite often the person setting up the meeting won't expect for every single invitee to respond. Therefore, in some embodiments once a certain percentage of invitees have responded back the method will then proceed along the "NO" branch to 321 and get on with setting up the meeting. The percentage of responses needed to proceed may be set up in advance either for that particular meeting or as a default value. The percentage could be any value between 0% and 100%, typically for example, anything over 50% of the invitees. Alternatively, the decision to proceed could be based upon the time left before the meeting (or time transpired since sending the invitations), or a particular date/time specified in advance. For example, the scheduling system may be set to proceed from 319 to 321 once three days have passed since sending out the meeting notice. Such a parameter specifying time passage could be described in terms of the percentage of time between sending the invitations out and the meeting time (e.g., 50% percent of the time has passed since sending the invitations). In some instances more than one decision rule may be used for block 319 (e.g., wait for 85% of the invitations to be returned, or until three days before the meeting, whichever comes first, to proceed from 319 to 321).

Based upon the decision rule(s) for block 319, if it is determined to wait for more invitations, then the method proceeds from 319 to 303. It may sometimes happen that the condition for proceeding to 321 is satisfied while waiting for further responses in block 305. If this happens, and while waiting for more invitations to be returned in 305, the conditions of 319 are satisfied to proceed to 321, the method proceeds from 305 along the dotted line back to 319. Once the conditions for proceeding with the method are satisfied in 319 the method proceeds from 319 along the "NO" path to 321. In 321 it is determined whether a sufficient number of responses have been received back to set up the meeting. For example, the person setting up the meeting may decide that some predefined percentage of the invitees must be available for the meeting to proceed (e.g., 60%; or any other specified percentage of invitees, or a default value). If fewer than the minimum number of invitees are available the method proceeds from 321 along the "NO" path to 323 to cancel the meeting. However, if it is determined in 321 that the threshold number of invitees is available for either the primary meeting or the alternate meeting, then the method proceeds from 321 along the "YES" path to 325.

In block 325 the system evaluates the invitation responses to ascertain which meeting would be preferred, the primary meeting time/place or the alternate meeting time/place. The decision as to which meeting is preferred may be based on a number of factors, including, for example, the particular people available for either meeting, the overall percentage of people able to attend the two meeting time/places, the need for holding the meeting earlier rather than later versus the predicted attendance of each meeting, or other like factors. Once it is decided in 325 which meeting to hold—the primary meeting or the alternate meeting—the method proceeds from 325 to 327 to finalize the meeting parameters and resources. This may entail confirming the room reservation, scheduling interactive teleconference links, slide projectors, television sets, or other media devices, ordering food, or any other logistical details that need to be attended to prior to the meeting.

Once the meeting parameters and resources have been taken care of in block 327 the method proceeds to 329 to send out the final meeting notices. Depending upon the preferences of the meeting coordinator and/or the requirements of the meeting, the meeting notices may be sent out to: all the invitees, only the invitees who responded, only the invitees who responded and are able to attend, to any of the aforementioned invitees plus some new invitees, or other like groups of people. After sending out the final meeting notices in 329 the method proceeds to 331 and ends.

FIG. 4 is an information technology system 400 suitable for implementing and practicing various exemplary embodiments of the meeting scheduling system with alternative meeting logics. Quite often, a company or organization will interconnect the various computers of their operation with a LAN or other such network so that the employees can access computer applications and information for business communications. FIG. 4 depicts a wireless LAN 401 connecting desktop computer 403-405, laptop computer 407, and the computer represented by block diagram 409. Other devices such as a wireless handset 435 (e.g., a cellular telephone or pager), a personal digital assistant (PDA) 433, or other such communication devices may be in communication with the computer network 400 either directly (e.g., via the wireless LAN 401) or by way of the Internet 450 or other network such as the public switched telephone network (PSTN) or a wireless network 451. The computers 403-409, the wireless LAN 401, the wireless handset 435 and PDA 433 are shown as examples in order to illustrate and explain an exemplary information handling system suitable for practicing the various embodiments. In practice, an organization may have many dozens—or even hundreds—of computers or information handling devices interconnected using one or more wired or wireless networks or other communications links. In some instances, a company may employ stand-alone computers not interconnected by any sort of network or links, or a combination of networked computers and stand-alone computers. Generally, however, most modern businesses facilitate communication between the computers of their employees by using a network to interconnect them. The network is also often used to provide access to the Internet 450 so that the employees may communicate and exchange information with the outside world, for example, via email.

Typically, a computer system such as the computer system 409 includes a processor 411 which may be embodied as a microprocessor or central processing unit (CPU). The processor 411 is typically configured to access an internal memory 413 via a bus such as the system bus 431. The internal memory 413 may include one or more of random access memory (RAM), read-only memory (ROM), cache memory, or a combination of these or other like types of circuitry configured to store information in a retrievable format. In some implementations the internal memory 413 may be configured as part of the processor 411, or alternatively, may be configured separate from it but within the same packaging. The processor 411 may be able to access internal memory 413 via a different bus, or via control lines (e.g., local bus 415) than it uses access the other components of computer system 409.

The computer system 409 also typically includes, or has access to, one or more storage drives 417 (or other types of storage memory) and floppy disk drives 419. The storage drive 417 is often a hard disk drive configured for the storage and retrieval of data, computer programs or other information. The storage drive 417 need not necessary be contained within the computer system 409. For example, in some embodiments the storage drive 417 may be server storage space within a network or the Internet that is accessible to the computer system 409 for the storage and retrieval of data, computer programs or other information. For example, the computer system 409 may use storage space at a server storage farm accessible by the Internet 450 or other communications lines. The floppy disk drives 419 may include a combination of several disc drives of various formats that can read and/or write to removable storage media (e.g., CD-R, CD-RW, DVD, DVD-R, floppy disk, etc.). The computer system 409 may either include the storage drives 417 and floppy disk drives 419 as part of its architecture (e.g., within the same cabinet or enclosure and/or using the same power supply), as connected peripherals, or may access the storage drives 417 and floppy disk drives 419 over a network, or a combination of these. The storage drive 417 is often used to store the software, instructions and programs executed by the computer system 409, including for example, all or parts of the computer application program for project management task prioritization.

The computer system 409 may include communication interfaces 421 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The various computers 403-409 may be connected to the Internet via the router 401 (which may be a wireless or a wired router) rather than being directly connected to the Internet. The components of computer system 409 may be interconnected by a bus 431 and/or may include expansion slots conforming to any of various industry standards such as PCI (Peripheral Component Interconnect), ISA (Industry Standard Architecture), or EISA (enhanced ISA).

Typically, the computer system 409 includes one or more user input/output devices such as a keyboard and/or mouse 423, or other means of controlling the cursor (e.g., touchscreen, touchpad, joystick, trackball, etc.) represented by the user input devices 425. A display 427 is also generally included as part of the computer system 409. The display may be any of several types of displays, including a liquid crystal display (LCD), a cathode ray tube (CRT) monitor, a thin film transistor (TFT) array, or other type of display suitable for displaying information for the user. The display 427 may include one or more light emitting diode (LED) indicator lights, or other such display devices. In addition, most computer systems 409 also include, or are connected to, one or more speakers and microphones 429 for audio output and input. Speech recognition software may be used in conjunction with the microphones 429 to receive and interpret user speech commands.

Various method activities may be included or excluded as described above, or performed in a different order than shown in the figures, and still remain within the scope of at least one exemplary embodiment. For example, the activities 307-317 in which the responses are handled and recorded may be performed after it is decided not the wait for any further responses (i.e., following a "NO" response to 319) or after a "YES" response to 321 indicates that a sufficient number of responses have been received to set up the meeting. It is understood that the scope of the present invention encompasses other such block diagram omissions, additions, or changes to the flow chart and figures. For illustrative purposes, the discussion in this disclosure refers to meetings being set up for employees of a company. In practice, however, the various embodiments may be used to set up any type of meeting for any type of organization or group of people.

The invention may be implemented with any sort of processing units, processors and controllers (e.g., processor 411 of FIG. 4) capable of performing the stated functions and activities. For example, the processor 11 (or other processors used to implement the embodiments) may be a microprocessor, microcontroller, DSP, RISC processor, or any other type of processor that one of ordinary skill would recognize as being capable of performing the functions or activities described herein. A processing unit in accordance with at least one exemplary embodiment can operate computer software programs stored (embodied) on a computer-readable medium such as the internal memory 413, the storage drive 417, or other type of machine-readable medium, including for example, floppy disks, optical disks, a hard disk, CD, flash memory, ram, or other type of machine readable medium as recognized by those of ordinary skill in the art.

The computer software products or application programs can aid in the performance of, or perform, the various steps and activities described above. For example computer programs in accordance with at least one exemplary embodiment may include: source code for sending a meeting invitation to each of the invitees specifying logistics for a primary meeting and an alternate meeting; source code for receiving responses from at least some of the invitees indicating availability to attend at least one of the primary meeting and the alternate meeting; source code for selecting either the primary meeting or the alternate meeting to be the selected meeting based on the responses received from the plurality of invitees; source code for sending out the final meeting notices informing invitees of the selected meeting; and source code for the other activities illustrated in the figures or otherwise described herein.

The use of the word "exemplary" in this disclosure is intended to mean that the embodiment or element so described serves as an example, instance, or illustration, and is not necessarily to be construed as preferred or advantageous over other embodiments or elements. The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method in an information handling system of setting up a meeting comprising:
    sending a meeting invitation to invitees specifying logistics for a primary meeting and logistics for an alternate meeting;
    receiving responses from a plurality of the invitees indicating availability to attend at least one of the primary meeting and the alternate meeting;
    determining whether to wait for further responses from the invitees based on reaching a predefined time that is prior to both a meeting time of the primary meeting and a meeting time of the alternate meeting;
    either cancelling both the primary meeting and the alternate meeting, or selecting one of the primary meeting or the alternate meeting, based on the responses received from the plurality of invitees and the determining, the selecting done under control of the information handling system, wherein the information handling system selects between the primary meeting or the alternate meeting based, at least in part, on a need to hold the meeting earlier rather than later and a predicted attendance for the primary meeting and a predicted attendance for the alternate meeting by executing software instructions stored on a non-transitory machine readable storage device; and
    sending out final meeting notices, under control of the information handling system, to at least those of the plurality of invitees available to attend the selected meeting.

2. The method of setting up the meeting according to claim 1, wherein the logistics for the primary meeting include the primary meeting time and primary meeting place and the logistics for the alternate meeting include the alternate meeting time and an alternate meeting place.

3. The method of setting up the meeting according to claim 1, wherein the meeting invitation is sent to the invitees by email, the method further comprising:
    defining the predefined time as being an amount of time having passed since sending the meeting invitations.

4. The method of setting up the meeting according to claim 1, further comprising:
    determining whether a sufficient number of the responses was returned to justify setting up the meeting.

5. The method of setting up the meeting according to claim 1, the method further comprising:
    finalizing parameters and resources for the selected meeting including at least one of the parameters and resources selected from a group consisting of reserving a room for the selected meeting, ordering food for the selected meeting, and ordering a media device to be used during the selected meeting; and
    canceling a room reservation for either the primary meeting or the alternate meeting whichever is not the selected meeting.

6. The method of setting up the meeting according to claim 1, wherein, upon at least one of the plurality of the invitees indicating an availability to attend both the primary meeting and the alternate meeting the method further comprises:
    prompting said at least one with a request to indicate a preference for either the primary meeting or the alternate meeting.

7. The method of setting up the meeting according to claim 6, wherein the selecting of either the primary meeting or the alternate meeting is based on the responses including said at least one indicating an availability to attend both the primary meeting and the alternate meeting with the preference specified for either the primary meeting or the alternate meeting.

8. A software product comprising a non-transitory machine readable medium including a program of instructions for setting up a meeting, wherein the program of instructions upon being executed on a computer causes the computer to perform activities comprising:
    sending a meeting invitation to invitees specifying logistics for a primary meeting and logistics for an alternate meeting;
    receiving responses from a plurality of the invitees indicating availability to attend at least one of the primary meeting and the alternate meeting;
    determining whether to wait for further responses from the invitees based on reaching a predefined time that is prior to both a meeting time of the primary meeting and a meeting time of the alternate meeting;
    either cancelling both the primary meeting and the alternate meeting, or selecting either the primary meeting or the alternate meeting based, at least in part on, the determining, a need to hold the meeting earlier rather than later, and a predicted attendance for the primary meeting and a predicted attendance for the alternate meeting that are based on the responses received from the plurality of invitees; and
    sending out final meeting notices to at least those of the plurality of invitees available to attend the selected meeting;
    wherein the computer selects either the primary meeting or the alternate meeting and sends out final meeting notices in response to executing the program of instructions stored on the non-transitory machine readable medium.

9. The software product according to claim 8, wherein the logistics for the primary meeting include the primary meeting time and a primary meeting place and the logistics for the alternate meeting include the alternate meeting time and an alternate meeting place.

10. The software product according to claim 8, wherein the meeting invitation is sent to the invitees by email, the activities further comprising:
defining the predefined time as being an amount of time having passed since sending the meeting invitations.

11. The software product according to claim 8, further comprising:
determining whether a sufficient number of the responses was returned to justify setting up the meeting.

12. The software product according to claim 8, further comprising:
finalizing parameters and resources for the selected meeting including at least one of the parameters and resources selected from a group consisting of reserving a room for the selected meeting, ordering food for the selected meeting, and ordering a media device to be used during the selected meeting; and
canceling a room reservation for either the primary meeting or the alternate meeting whichever is not the selected meeting.

13. The software product according to claim 8, wherein, upon at least one of the plurality of the invitees indicating an availability to attend both the primary meeting and the alternate meeting the activities further comprise:
prompting said one with a request to indicate a preference for either the primary meeting or the alternate meeting.

14. The software product according to claim 13, wherein the selecting of either the primary meeting or the alternate meeting is based on the responses including said at least one indicating an availability to attend both the primary meeting and the alternate meeting with the preference specified for either the primary meeting or the alternate meeting.

15. A computer system configured to set up a meeting, the computer system comprising:
a communication interface configured to send a meeting invitation to invitees specifying logistics for a primary meeting and an alternate meeting;
a storage memory configured to store responses received from a plurality of the invitees indicating availability to attend at least one of the primary meeting and the alternate meeting; and
a processor configured to perform instructions for determining whether to wait for further responses from the invitees based on reaching a predefined time that is prior to both a meeting time of the primary meeting and a meeting time of the alternate meeting, and either cancelling both the primary meeting and the alternate meeting, or selecting one of the primary meeting or the alternate meeting, based on the responses received from the plurality of invitees and the determining, wherein the processor selects between the primary meeting or the alternate meeting based, at least in part, on a need to hold the meeting earlier rather than later and the responses received from the plurality of invitees, and controlling the communication interface;
wherein the communication interface is further configured to send out final meeting notices to at least those of the plurality of invitees available to attend the selected meeting.

16. The computer system according to claim 15, wherein the logistics for the primary meeting include the primary meeting time and a primary meeting place and the logistics for the alternate meeting include the alternate meeting time and an alternate meeting place.

17. The computer system according to claim 15, wherein the predefined time is determined by an amount of time having passed since sending the meeting invitations.

18. The computer system according to claim 15, wherein the storage memory stores an email application configured to send the meeting invitation to the invitees by email via the communication interface.

19. The computer system according to claim 15, further comprising:
a display configured to display a prompt requesting a one of the plurality of the invitees to indicate a preference for either the primary meeting or the alternate meeting upon at least one of the plurality of invitees indicating an availability to attend both the primary meeting and the alternate meeting.

20. The method of setting up the meeting according to claim 1, wherein the meeting invitation is sent to the invitees by email, the method further comprising:
determining whether to wait for further responses from the invitees based on a percentage of the invitees who have already responded.

21. The software product according to claim 8, wherein the meeting invitation is sent to the invitees by email, the activities further comprising:
determining whether to wait for further responses from the invitees based on a percentage of the invitees who have already responded.

22. The computer system according to claim 15, wherein the processor is further configured to perform instructions for determining whether to wait for further responses from the invitees based on a percentage of the invitees who have already responded.

23. The computer system according to claim 19, wherein the selecting of either the primary meeting or the alternate meeting is based on the responses including said at least one indicating an availability to attend both the primary meeting and the alternate meeting with the preference specified for either the primary meeting or the alternate meeting.

* * * * *